Figure 1:
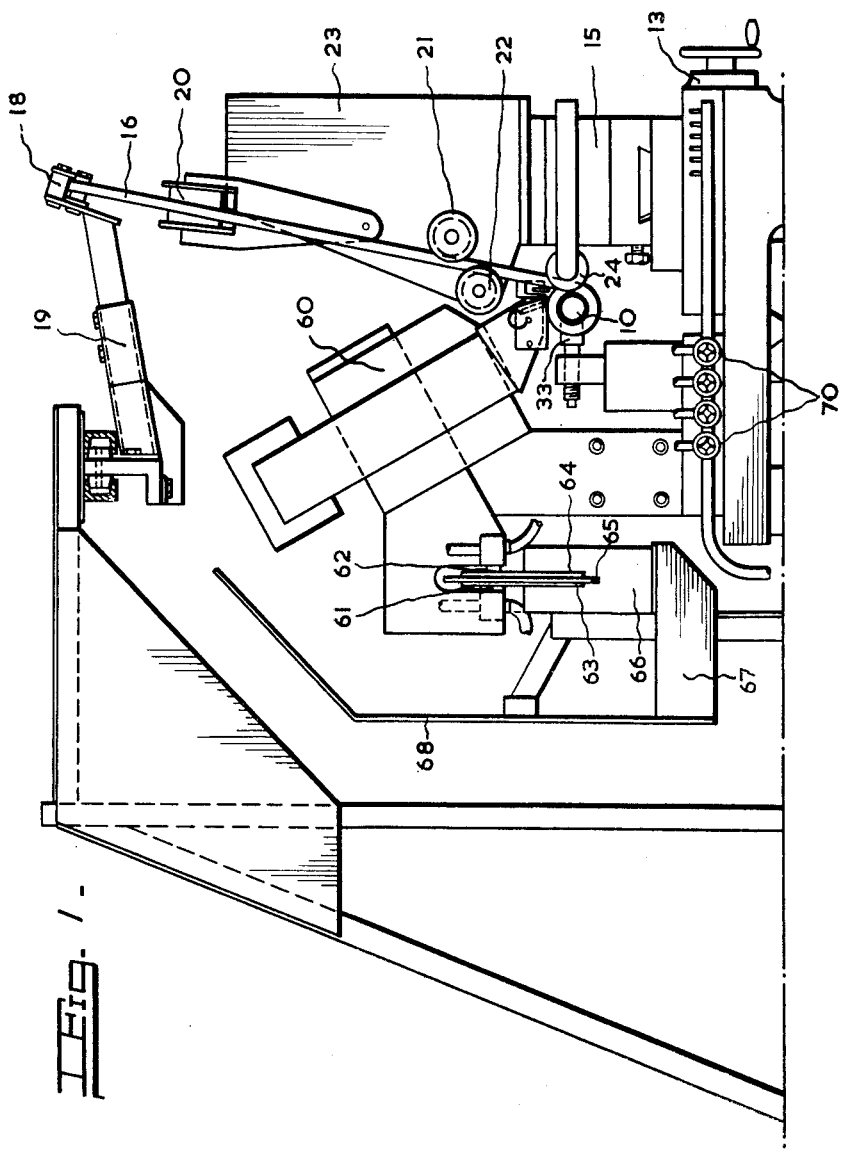

June 13, 1961

A. S. HALL 2,988,628

MANUFACTURE OF FINNED TUBE

Filed Sept. 26, 1958

5 Sheets-Sheet 1

Inventor
Arthur Samuel Hall
By: Scrivener and Parker
attorneys

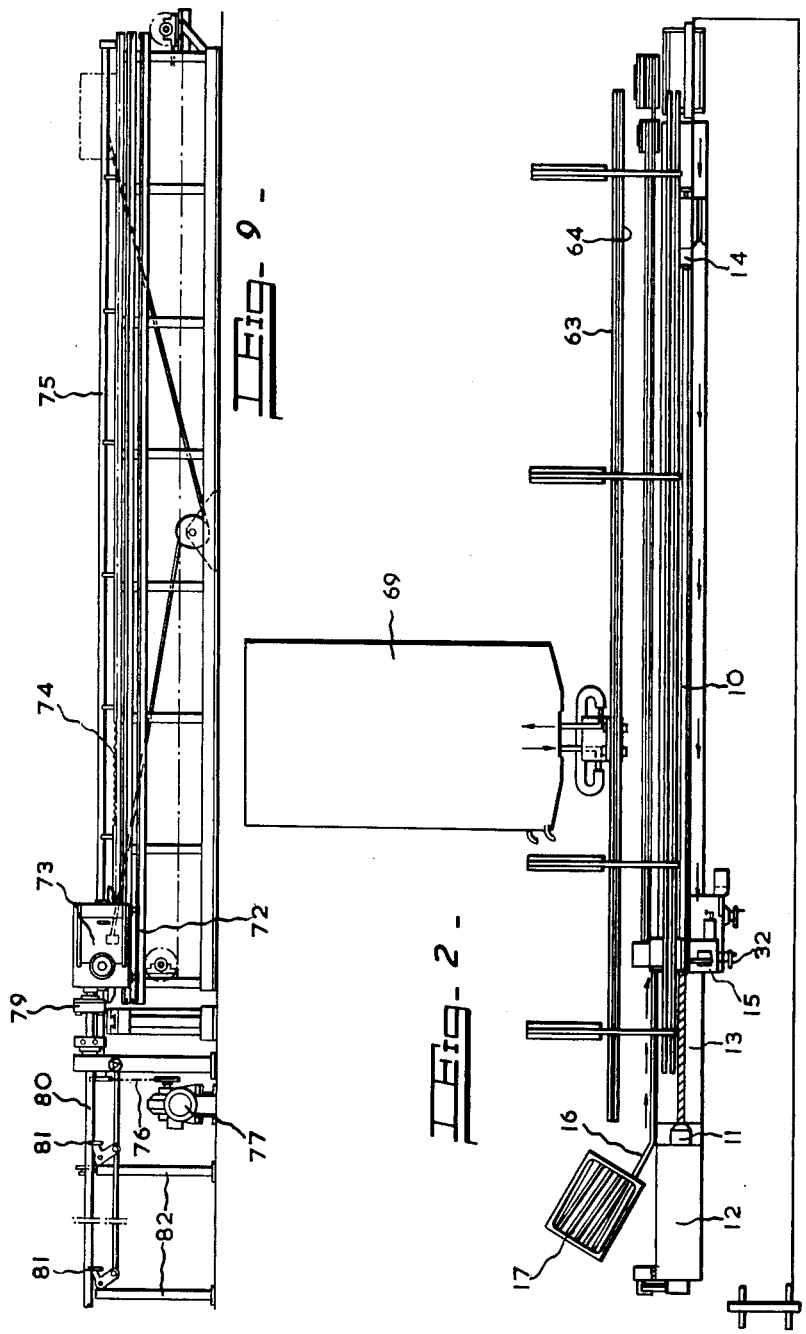

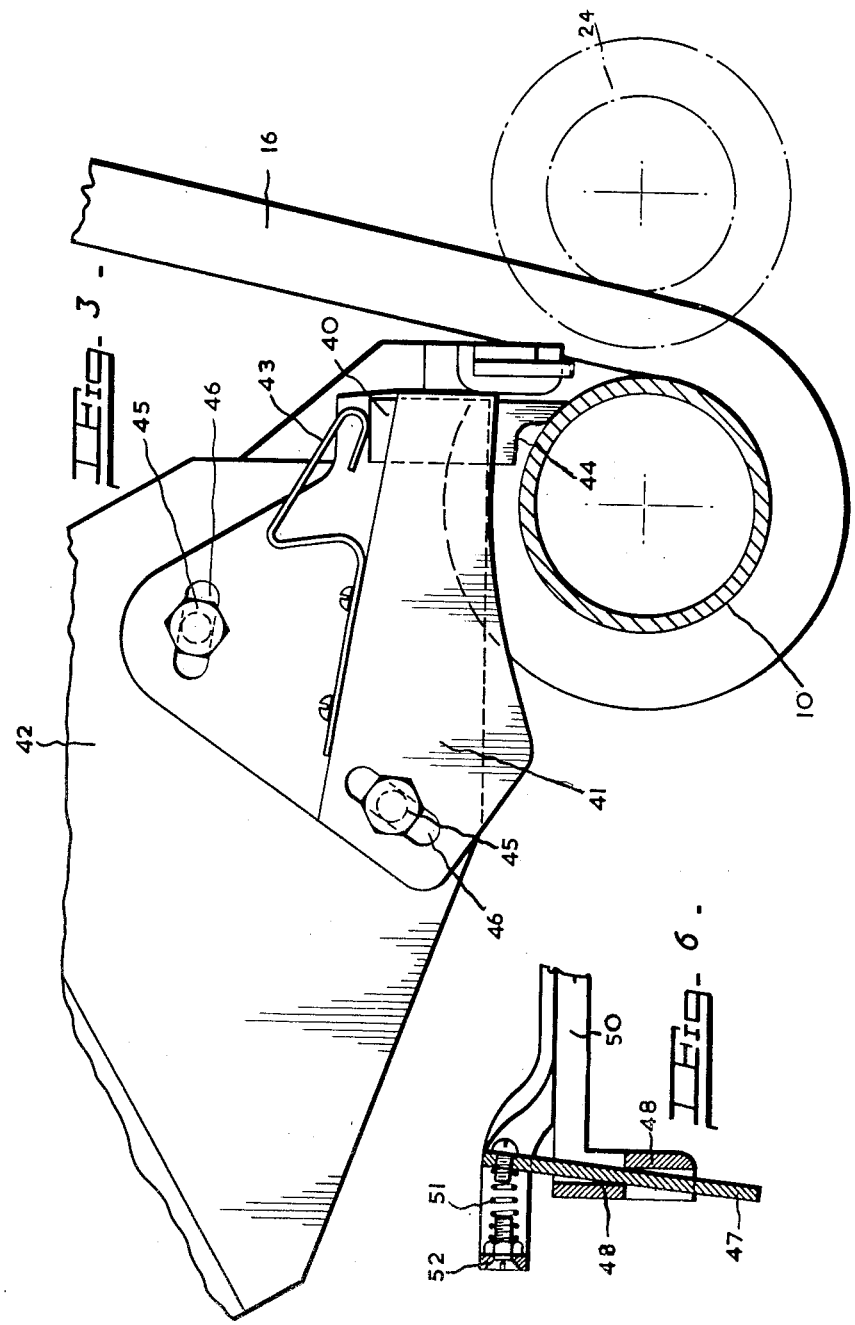

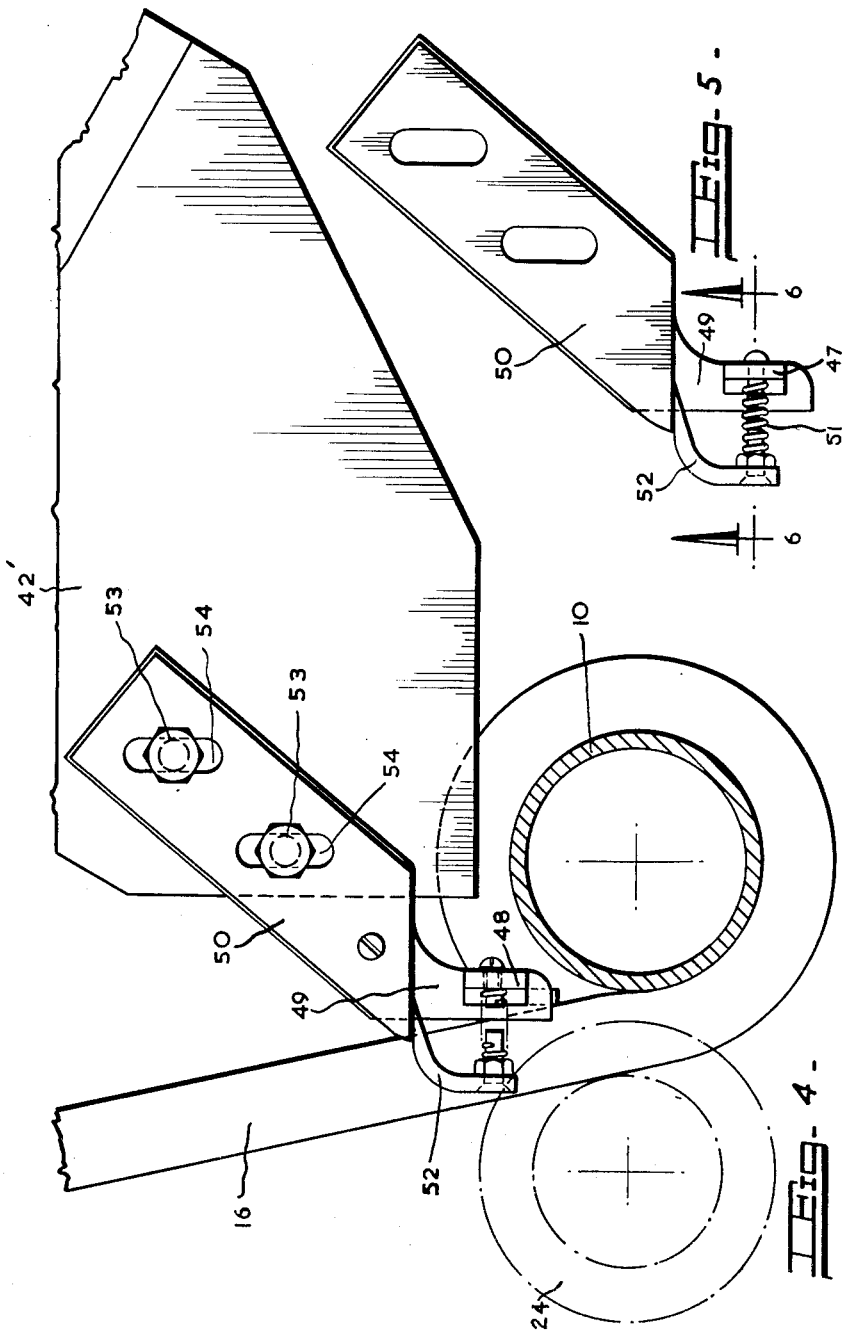

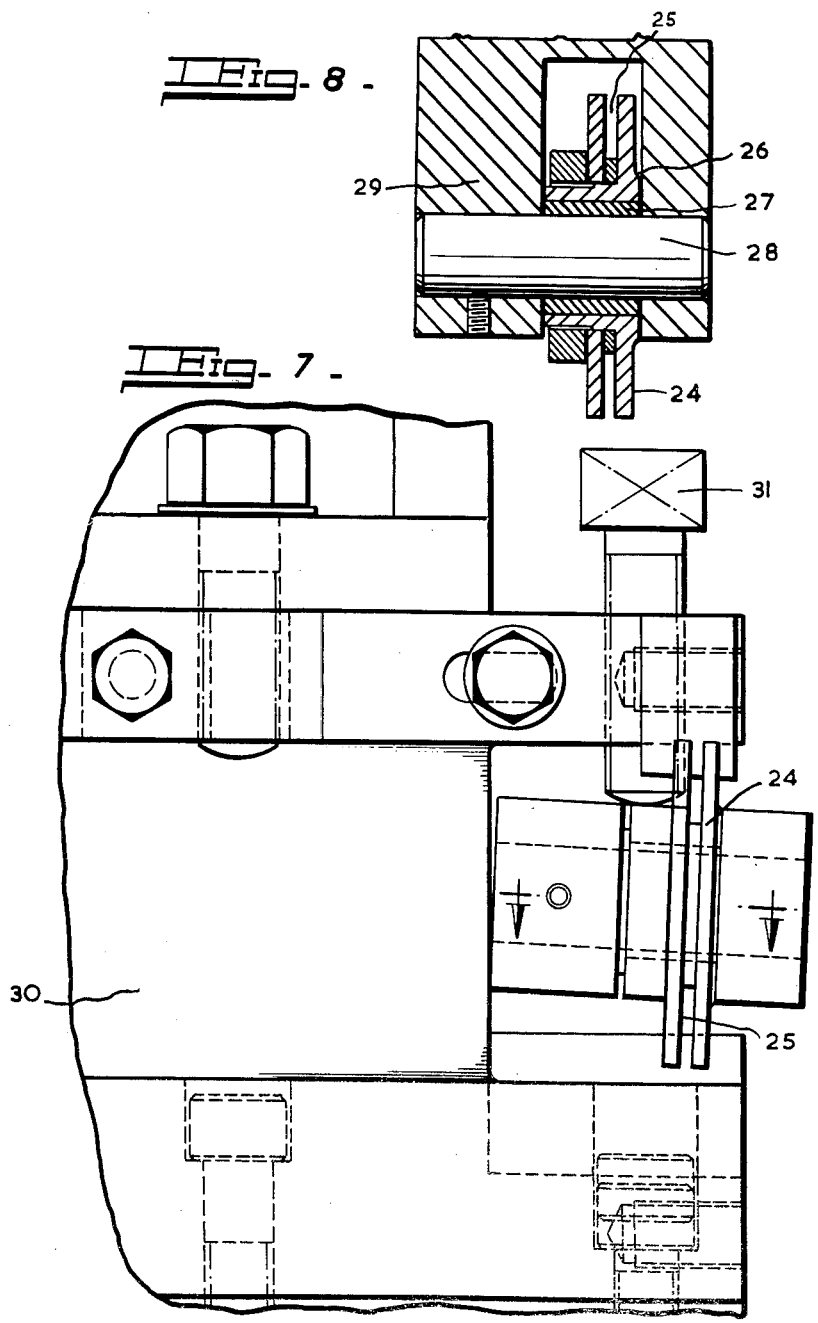

United States Patent Office 2,988,628
Patented June 13, 1961

2,988,628
MANUFACTURE OF FINNED TUBE
Arthur Samuel Hall, Kings Heath, Birmingham, England, assignor to Tube Products Limited, Oldbury, Birmingham, England, a British company
Filed Sept. 26, 1958, Ser. No. 763,599
Claims priority, application Great Britain Oct. 3, 1957
2 Claims. (Cl. 219—107)

This invention relates to the manufacture of finned tube for use in heat exchangers and for other purposes requiring heat transference between fluids.

It is known to provide heat exchange tubes with extended surfaces by welding fins or studs to the outer surface of the tube.

One object of our invention is to produce economically a tube having a continuous helical fin welded to its surface.

Our invention comprises a method of producing helically finned tube consisting in winding a strip on to a tube in edge contact and applying a high frequency welding current through brushes or electrodes engaging the strip and the surface of the tube at points adjacent to the point of first contact of the strip with the tube, the tube and means for feeding the strip and applying the current being relatively movable in the direction of the axis of the tube.

One brush or electrode preferably engages the inner edge of the strip a short distance in advance of its point of contact with the tube, and the other brush or electrode engages the surface of the tube at a point adjacent to and substantially in alignment with the approaching edge of the strip.

The tube will normally be rotated about its axis by any convenient means while the strip is fed on to the tube with its inner edge substantially tangential to the surface of the tube. The brushes or electrodes and the means for feeding the strip and applying pressure to it may be mounted on a carriage movable in a direction parallel to the axis of the tube, or alternatively, the tube and the means by which it is rotated may be movable axially relative to a stationary head carrying the brushes or electrodes and the strip feeding means.

As the inner edge of the strip approaches the surface of the tube, it and the part of the surface with which it is about to make contact are raised to welding temperature, and under the radial pressure applied to the strip its inner edge is continuously and effectively welded to the tube, the weld being homogeneous over the full thickness of the strip so that in the finished tube there is full heat conductivity between the tube and the fin.

The brushes or electrodes are preferably arranged to make contact with the strip and with the surface of the tube as close as is practically convenient to the welding point. The welding current is adjusted in accordance with the diameter and speed of rotation of the tube and with the thickness of the fin.

The spacing between the brushes or electrodes and the welding point is related to the thickness of the fin, and means may be provided for adjusting individually the positions of the brushes or electrodes relative to the welding point.

The radial pressure applied to the strip is important and is set in accordance with various factors including the thickness of the strip and the welding current. Sufficient pressure is required to ensure a satisfactory weld over the full thickness of the strip without buckling or deforming the strip.

The means for guiding the strip on to the tube may be arranged to curve the strip in the reverse direction to that in which it is wound on to the tube for a short distance in advance of the point at which it comes into contact with the tube, so that additional room is provided for the brushes or electrodes.

Experimental work has shown that steel strip can be effectively welded to a steel tube in the form of a helix at speeds of up to 120 revolutions per minute with a tube of 2 inches diameter, and there is no doubt that considerably higher speeds can be attained.

Our process can be applied to steel tubes with a steel fin or to tubes and fins of any other material capable of being welded.

A preferred machine for producing helically finned tube in accordance with our invention and a modification thereof are illustrated by way of example in the accompanying drawings in which:

FIGURE 1 is an end view of a complete machine,
FIGURE 2 is a plan of the machine on a smaller scale,
FIGURE 3 is a fragmentary end elevation on a larger scale of the brushes or electrodes through which high frequency current is applied to the tube and strip,
FIGURE 4 is a detail end elevation from the other side of the brush or electrode through which current is applied to the strip,
FIGURE 5 is an end elevation of the brush or electrode and its holder alone,
FIGURE 6 is a section on the line 6—6 of FIGURE 5,
FIGURE 7 is a front elevation of the guiding and pressure-applying roller and its mountings,
FIGURE 8 is a section on the line 8—8 of FIGURE 7,
FIGURE 9 is a side elevation of a machine in which the tube is both rotated and moved axially, and the brushes or electrodes and the strip feeding means are carried by a stationary head.

In the machine shown in FIGURES 1 to 8, the tube 10 is mounted at one end in a chuck 11 carried by a driven shaft in the headstock 12 of a lathe having a bed 13 of a length greater than that of the tube. The other end of the tube is supported by a centre 14 or other means allowing the tube to rotate but locating it against any axial movement.

A saddle or carriage 15 is guided for movement on the bed of the lathe in a direction parallel to the axis of the tube, the length of travel being at least equal to the length of the tube, and the saddle or carriage carries means for feeding the strip 16 to the tube and applying pressure to it and means for applying high frequency current of the tube and strip. The movement of the saddle or carriage is effected by any convenient known means such as a lead screw or rack and pinion mechanism coupled to the headstock spindle through gearing of which the ratio is selected according to the pitch of the helical fin.

The strip 16 is drawn from a reel 17 at one end of the lathe and is fed through guide rollers 18 supported by a traveling arm 19 guided for movement in an overhead runway parallel to the axis of the tube. From the guide rollers 18 the strip passes downwardly over a guide roller 20 on the carriage 15 and between two staggered grooved rollers 21 and 22 mounted on a bracket 23 on the carriage. The rollers 21, 22 feed the strip to the tube in a substantially tangential direction and as the inner edge makes contact with the surface of the tube it is guided and urged into engagement with the surface by a pressure roller 24. This roller, which with its mounting is shown in detail in FIGURES 7 and 8, has a peripheral groove 25 of a radial depth only slightly less than the width of the strip and of a width such that the strip can slide in it, but is positively guided by it. The inner surface of the groove 25 is formed by a ring 26 of hardened wear-resisting metal. The roller is rotatably mounted by means of a bush 27 on a rigid spindle 28 traversing a slot in a bar 29 which is mounted in a housing 20 in which it is clamped by means of studs 31.

By adjustment of the studs the angle made by the axis of the roller with the horizontal plane containing the axis of the tube can be varied according to the pitch of the fin to be applied to the tube. The housing 30 is movable transversely on the carriage by screw means such as a traversing screw actuated by a hand-wheel 32 for adjusting the pressure with which the roller forces the strip against the surface of the tube. In the arrangement illustrated the axis of the roller is at a very slightly higher level than the axis of the tube and the roller guides and supports the strip substantially up to its point of contact with the tube which is between these two planes.

A steady 33 engages the tube on the side opposite the pressure roller to prevent deflection of the tube by the applied pressure.

As the inner edge of the strip approaches the point of contact with the surface of the tube it and the part of the surface with which it is about to make contact are raised to welding temperature by the application of high frequency current through brushes or electrodes in contact with the parts to be heated.

These brushes or electrodes are shown in detail in FIGURES 3, 4, 5 and 6. The brush 40 which engages the surface of the tube is a flat copper alloy blade slidably guided for vertical movement in a holder 41 adjustably secured to a copper plate or check 42 extending forwardly from a transformer. The upper end of the brush is engaged by a blade spring 43 which urges the brush downwardly to hold its lower end in engagement with the tube. The lower end of the brush is shaped as shown at 44 so that only the forward part of its end face engages the tube, and the area of contact remains substantially constant as the brush wears. The holder 41 is secured to the cheek 42 by bolts 45 passing through mutually inclined slots 46 in the holder so that the holder can be adjusted to vary the point of contact of the brush with the tube relative to the point of contact of the strip with the tube.

The other brush 47 comprises a horizontal L-shaped copper alloy bar mounted to rock in a substantially horizontal plane between two staggered abutments 48, 48 on a cranked arm 49 extending downwardly from a lug 50 adjustably secured to a second copper sheet or cheek 42′ extending forwardly from the other side of the transformer. One end of the brush is engaged by a spring 51 located between the brush and a cranked finger 52 on the arm to urge the other end of the brush into engagement with the inner edge of the strip 16 at a point a short distance above the point of engagement of the strip with the surface of the tube.

This arrangement of the brushes allows the point of contact of the first brush 40 with the surface of the tube to lie in the same vertical plane as the approaching edge of the strip, and the heating of the tube surface is confined to a narrow band on to which the strip moves.

The lug 50 is secured to the plate or cheek 42′ by bolts 53 passing through vertical slots 54 in the lug to allow the point of contact of the brush 47 with the edge of the strip to be adjusted towards and away from the point of contact of the strip with the tube.

The spacing between the brushes and the welding point is related to the thickness of the strip.

High frequency current is conveyed to the brushes through the copper plates or cheeks 42, 42′ from a water cooled transformer 60 picking up current through spring-loaded contacts 61, 62 from flat copper bus-bars 63, 64 mounted on opposite sides of a flat strip 65 of insulating material. The bus-bars extend for the full length of the machine parallel to the axis of the tube and are supported at intervals in insulating blocks 66 on mounting brackets 67. A guard 68 shields the bus-bars. High frequency current is fed to the bus-bars from an oscillator 69.

The pressure roller and other parts adjacent to the welding point are conveniently cooled in the conventional way by water sprays, and the tube and fin beyond the welding point are similarly cooled. Some of the valves controlling the water supply are shown at 70 in FIGURE 1.

Various means may be employed for locating the free end of the strip relative to the tube at the start of the operation. The end of the strip may, for example, be temporarily attached to the chuck in which the end of the tube is held or it may be clamped by means of a set-pin in a helical slot in the periphery of a split collar clamped on the tube. To avoid any scrap where the fin is to extend to the extreme end of the tube the collar may be mounted on a collet which is fitted into the end of the tube and is held in the chuck by which the tube is rotated.

The machine is then started and the welding current is switched on, and as the tube rotates the strip is wound on to the tube and its inner edge is continuously welded to the surface of the tube to form a continuous helical fin of which the pitch depends on the ratio of the gearing between the headstock spindle by which the tube is rotated and the means for moving the carriage or saddle longitudinally.

The welding of the strip to the surface of the tube under pressure produces an upset or flash on each side of the strip at the welding point and if the pitch is fine this may interfere with the welding of the next turn of the helix. To avoid this means may be provided a short distance behind the welding point to remove the upset or flash on the outer side of the strip. Further means may be arranged at any convenient point to remove the upset or flash on the other side of the fin. The removal of the upset or flash may be effected by turning tools, milling cutters, grinding wheels, or other convenient means, and by using tools of suitable form a fillet of radiused or other form can be produced at the junction of the strip with the tube.

A scraper may be mounted adjacent to the periphery of the pressure roller to keep it clear of any swarf or other foreign matter which may adhere to it.

In the machine described above, the tube rotates but does not move axially and the welding head and the means for feeding and applying pressure to the strip are moved longitudinally parallel to the axis of the tube.

The process can be carried out equally well in a machine in which the welding head and the means for feeding and applying pressure to the strip are stationary and the tube both rotates and moves axially.

Such a machine is shown in FIGURE 9. The bed 72 of the machine is of a length at least equal to that of the tube to be finned. A carriage 73 is guided for longitudinal movement on the bed and its movement is effected by a driven pinion meshing with a longitudinal rack 74. The pinion is driven through change-wheel gearing within the carriage by a longitudinal splined or key-wayed shaft 75 slidable through one of the gears. The shaft is driven by a chain 76 from a motor 77 and is also geared to and drives a chuck 79 in which the end of the tube is held. The tube 80 is supported on rollers 81 on pillars 82 initially. Thus the tube is rotated and moved axially at a speed related to the speed of rotation by the ratio of the interposed gearing, and the strip to form the fin is wound on to it and welded to it by means as described above, but carried by a stationary support.

The high frequency welding current supplied to the brushes is conveniently of a frequency of the order of 450,000 cycles per second. Current of this frequency follows the path of least impedance which is along the edge of the strip and over a narrow band of the surface of the tube between the brushes and the point of engagement of the strip with the tube.

Only a surface layer of the tube of small depth is heated to welding temperature and the structure of the tube wall is not affected.

The strip which forms the fin need not be a flat strip of uniform thickness and may be of tapered or other cross-section and may be waved or corrugated.

It will be apparent from the above description that our improved process enables a helical fin of any desired pitch to be welded to a tube economically and at a high rate of production.

I claim:

1. Apparatus for the production of helically finned tube of the type having a radial strip helically wound onto the outer surface of the tube with the abutting edge of the strip being welded to said tube, the combination comprising means for guiding said strip in edgewise relationship onto said tube and means for electrically welding the edge of said strip to said tube by high frequency current, said guiding means comprising a grooved roller inclined at the helix angle of the strip, the groove of said roller having a radial depth only slightly less than the width of said strip and a transverse width only slightly greater than the corresponding dimension of said strip whereby said strip has a sliding fit in said groove and is supported against buckling through the majority of the width of said strip as it is fed onto said tube, the bottom of said groove engaging the outer edge of said strip at a point substantially in transverse alignment with the point of engagement of the inner edge of said strip with said tube, means for adjusting the position of said roller towards and away from said tube so as to determine the pressure of engagement of said strip with said tube, said electric welding means comprising brush means connected to a source of high frequency current, one of said brush means engaging the inner edge of the strip at a point in advance of and closely adjacent to the point of first engagement of the strip with the tube, the other of said brush means engaging the surface of the tube in advance of said point of first engagement and substantially in alignment with the approaching edge of the strip.

2. Apparatus as in claim 1 including a steady engaging the tube on the side opposite the roller to prevent deflection of the tube by the applied pressure.

References Cited in the file of this patent

UNITED STATES PATENTS

| | | |
|---|---|---|
| 1,542,984 | Blum | June 23, 1925 |
| 1,909,704 | Morseth | May 16, 1933 |
| 2,107,831 | Morseth | Feb. 8, 1938 |
| 2,376,762 | Ferguson | May 22, 1945 |
| 2,381,742 | Guirl | Aug. 7, 1945 |
| 2,821,619 | Rudd | Jan. 28, 1958 |